July 14, 1959  J. J. GREBE  2,894,891
NUCLEAR REACTOR
Filed Dec. 15, 1949

INVENTOR.
John J. Grebe
BY
ATTORNEY tates Patent Office 2,894,891
Patented July 14, 1959

2,894,891

NUCLEAR REACTOR

John J. Grebe, Midland, Mich., assignor to the United States of America as represented by the United States Atomic Energy Commission Application December 15, 1949, Serial No. 133,122

5 Claims. (Cl. 204—193.2)

This invention relates generally to the nuclear reactor art and is particularly concerned with high temperature reactors of novel design which are uniquely adapted to serve as the heat source for nuclear powered rockets, although not necessarily being limited to such use.

As used in this specification and in the appended claims, the following terminology is defined as indicated below:

Thermal neutrons (slow neutrons): Neutrons having a substantially Maxwellian number-energy distribution characteristic about an energy value equal to $kt$, where $k$ is a constant and $t$ is the temperature in degrees, Kelvin. ($kt=0.025$ electron volts at 15 degrees centigrade.)

Fission: The splitting of an atomic nucleus, upon the absorption of a neutron, into a plurality of fragments of greater mass than that of an alpha particle, the splitting being accompanied by the release of energy and a plurality of neutrons.

Fissionable: Having the ability to undergo fission upon the absorption of a slow neutron.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron induced fission. Such a system has been termed a nuclear reactor, or "pile." Since the general principles of design, operation, and control of such reactors have now been well publicized in the literature, a knowledge of such general principles will be assumed in what follows. Reference is made particularly to "The Science and Engineering of Nuclear Power," Addison-Wesley Press, Inc., Cambridge, Massachusetts, vol. I (1947), and vol. II (1949).

The utilization of a nuclear reactor as the heat source of a rocket permits the use of a low molecular weight gas, such as hydrogen, as the thrust producing medium. Chemically powered rockets, of course, must rely on the relatively high molecular weight gaseous combustion products of the fuel used as the thrust producing medium. The molecular weight of the combustion products of commonly used rocket fuels is about 22. Since the thrust per pound of fuel varies inversely in accordance with the square root of the molecular weight of the thrust producing gas, it is immediately apparent that a nuclear powered rocket using hydrogen as the working fluid would have a specific impulse many times higher than that obtainable with any chemically powered rocket. Since the actual value of specific impulse which might be obtained in this way is comparable to the value theoretically necessary in order to overcome the earth's gravitational field, the realization of an "escape" rocket for use in inter-planetary travel, or as a man made satellite, becomes for the first time a real possibility.

Insofar as the power plant as a whole is concerned, the basic design of a nuclear powered rocket involves merely the substitution of a nuclear reactor for the combustion chamber of a conventional chemically powered rocket. However, the design of a nuclear reactor which is suitable for this application represents a serious and specialized problem. It will readily be apparent that such a reactor must satisfy stringent requirements as regards size, weight, operating temperature, fissionable material inventory, and heat transfer characteristics.

It is inherent in the operation of a nuclear power plant for a rocket that most of the fuel (fissionable material) remains unused after any one operation or flight. This, of course, arises from the requirement that there always be present a minimum critical mass of fissionable material in order to maintain the neutron chain reaction, the actual value of the critical mass depending upon the particular reactor design. In the case of a nuclear powered escape rocket, the unused fissionable material is, of course, forever lost. These considerations dictate that the moderator material utilized in a nuclear reactor intended for this purpose should be chosen from those materials having the optimum nuclear properties from the standpoint of minimizing the critical size and mass of the reactor. Unfortunately, however, this desideratum is found to conflict with the requirement that the moderator material must also be able to withstand the high operating temperatures necessary in this type of application. Confronted with these conflicting requirements, applicant conceived that it would be possible to take advantage of the fact that the operating temperature of the reactor increases sharply from the coolant inlet end thereof to the coolant outlet end. In accordance with the principles of the present invention, therefore, applicant, in effect, divides the entire reactor into a plurality of zones or sections along the direction of the temperature gradient, and in each section he utilizes the best moderator material from a critical size and mass standpoint which at the same time can withstand the operating temperature of that section.

Accordingly, it is the broad object of the present invention to provide a nuclear reactor which is particularly adapted for use as the heat source of a rocket.

Another object of the invention is to provide a nuclear reactor having an extremely high maximum operating temperature.

Still another object of the invention is to provide a nuclear reactor having at the same time a high maximum operating temperature and a small critical size and mass.

A further object of the invention is to provide a nuclear reactor which has progressively better refractory properties in the direction of coolant flow.

Still a further object of the invention is to provide a nuclear reactor of space variable nuclear characteristics, the nuclear characteristics in any zone of which are dependent upon the expected operating temperature of that zone.

Figure 1:
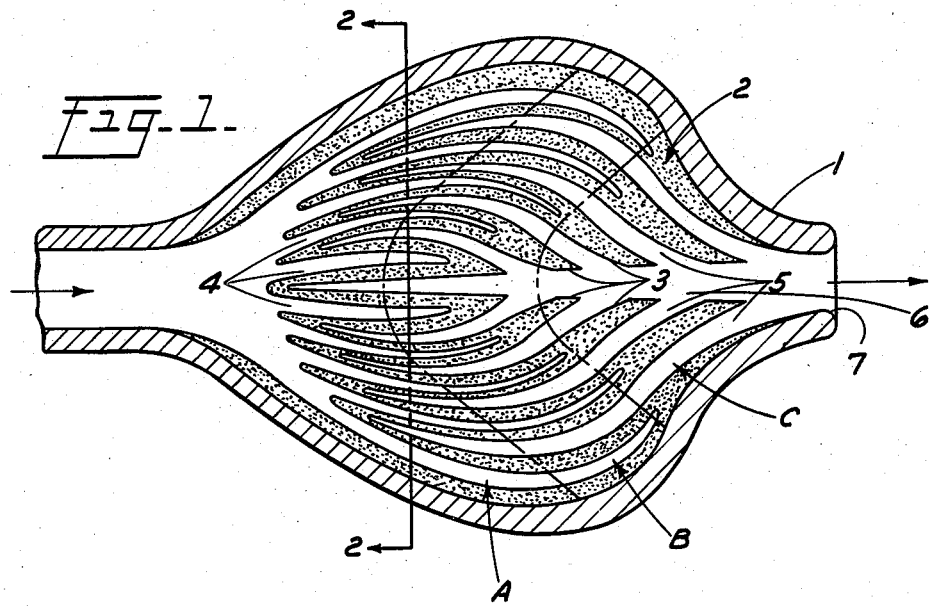
Fig. 1 is a sectional elevation view of a nuclear reactor constructed in accordance with the principles of the present invention and operating as the heat source of a rocket.
Figure 2:
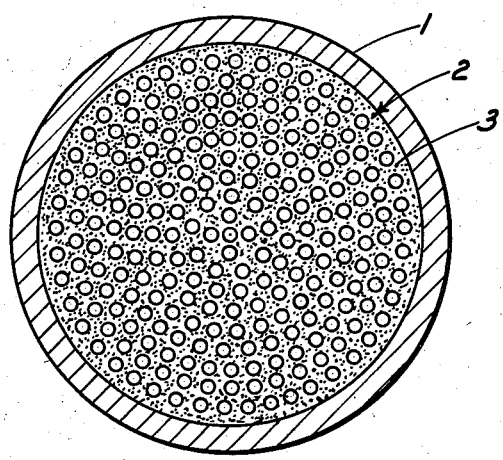
Fig. 2 is a cross section taken along the lines 2—2 of Fig. 1.

Referring now to the drawings for a detailed description of the invention, reference numeral 1 designates a tubular heat resistant casing which provides the main coolant gas passageway to and away from a nuclear reactor 2 in a rocket. It is to be understood that casing 1 terminates at its left end at the source of the working fluid (coolant gas). The working fluid would preferably be hydrogen or helium gas which is permitted to vaporize from a liquid storage tank.

The nuclear reactor 2 has a generally spherical shape, in the case illustrated, and the tubular casing 1 has a bulbous portion conforming to and accommodating the spherically shaped reactor. At the coolant exit end, both the casing 1 and the reactor 2 converge inwardly in a gradual fashion so as to form a jet nozzle, as indicated at 7.

As applicant has chosen to illustrate his invention, the reactor is provided with neither a radiation shield nor a neutron reflector, although either or both of these features might be provided, if desired, depending upon the particular application. Accordingly, in the case illustrated, the entire reactor forms what is known in the nuclear reactor art as the core or active portion, that is, it is formed entirely of an active material containing fissionable nuclei such as U-233, U-235, or Pu-239. This active material also contains low atomic weight elements such as hydrogen, beryllium, lithium or carbon, in elemental or compound form, these elements acting simultaneously as diluents for the fissionable nuclei and as moderators to slow down the fission neutrons. Thus, the active material includes a fissionable constituent and a moderator constituent, the moderator constituent being present in much the greater proportion so that it, in reality, is the base from which the active material is formed. The active material is preferably fabricated as a gas permeable porous material so that it is interlaced in a random manner with very small inter-connecting bores or capillary tubes through which the coolant gas may flow. Forty percent porosity of the active material can be readily obtained by conventional metallurgical techniques.

The reactor 2 can perhaps best be visualized as being formed of a plurality of hollow tapered tubular segments 3 of the active material, said segments being arranged side by side in all radial directions from the common axis of the reactor 2 and casing 1. At the right end, each segment converges to a close, while at the left open end, each segment is joined to the adjacent segments. The hollow interior of the various segments thus form tapered inlet ducts 4 for the entrance of incoming cold gas. Similar tapered outlet ducts 5 for the emergence of the hot gas are formed between the outer walls of adjacent segments. As shown, in the longitudinal direction, the segments are bowed outwardly to form the generally spherical shape of the reactor as a whole. The segments become longer as the outer surface of the reactor is approached, the additional length being curved inwardly back toward the reactor axis in overlapping relation to the right end of the inwardly adjacent segment. In this manner, the outlet ducts 5 all merge into a main central coolant outlet channel 6. It will be observed that channel 6 gradually diverges and, in turn, merges into jet nozzle 7.

In operation, the cold gas enters the reactor 2 by way of inlet ducts 4 and thereafter traverses the porous active material which forms the walls of segments 3. The heated gas then emerges by way of outlet ducts 5, central channel 6, and jet nozzle 7 to thereby provide the necessary thrust. It will be apparent that there is a natural increase in the gas passage area as the gas moves radially outward through the walls of segments 3. This increase in gas passage area is, of course, in the right direction to conform to the expansion of the gas as its temperature increases. By virtue of the porous construction of the active material, the heat absorbing gas is enabled to approach very closely the actual points of origin of the heat, that is, the fissionable nuclei. Accordingly, the average length of the heat conduction path through the moderator constituent of the active material is kept to a minimum. Also by virtue of the porous construction, there are provided a multitude of parallel paths of gas flow through the active material, each of the paths being of a relatively short length. Thus, a huge volume of gas per second may be forced through the reactor without suffering an excessive pressure loss.

The reactor, as thus far described in the detailed description, is disclosed and claimed in copending U.S. patent application Serial No. 119,228 for Nuclear Reactor, filed October 3, 1949, in my name.

According to the principles of the present invention, the reactor 2 is divided into a plurality of zones or sections in the direction of the temperature gradient, the individual zones differing from one another in respect to their nuclear characteristics and their heat resisting properties. In the drawings, the zones are illustrated as three in number, and are designated A, B, and C, respectively, from the cold to the hot end of the reactor. The desired variation in characteristics of the active material is effected by utilizing a different moderator constituent for the active material of the different zones. Thus, in zone C, the active material has to withstand the maximum operating temperature, which may be in the neighborhood of 3500° C. Accordingly, a highly refractory moderator material, such as graphite, is employed in zone C. Zones B and A operate at successively lower temperatures. Accordingly, in these zones, moderator materials are employed which have successively poorer heat resistant characteristics but successively better nuclear characteristics.

The nuclear characteristic of the moderator which is of most interest from the standpoint of minimum critical size and mass is its neutron slowing down power. Physically, the neutron slowing down power of a material is equal to the average loss in the logarithm of its energy which a neutron experiences by reason of elastic collisions in traveling one centimeter within the material in question. Accordingly, in any particular zone, all of those moderator materials which can withstand the operating temperature of that zone and which have acceptably low values of thermal neutron absorption cross-section, that one is employed which has the highest neutron slowing down power. For the purposes of this application, it will be understood that in order to qualify as a moderator at all, a material must have a neutron slowing down power greater than 0.01 cm.$^{-1}$. Thus, the moderator employed in zones A, B, and C might, for example, be Li$^7$H, Be$_2$C, and graphite, respectively. Li$^7$H has a very high value for its neutron slowing down power, about 2.0 cm.$^{-1}$, whereas it can withstand a temperature of only about 680° C. The intermediate zone moderator, Be$_2$C, has a neutron slowing down power of about 0.087 cm.$^{-1}$ and can withstand a temperature of about 2100° C. The slowing down power of graphite is about 0.065 cm.$^{-1}$ and it can withstand temperatures as high as 3500° C. It will be understood that the reactor may be divided into as many such zones as is deemed necessary and practicable in the particular application. For example, BeO, with a neutron slowing down power of about 0.092 cm.$^{-1}$ and a melting point around 2570° C., might be employed as the moderator of a fourth zone disposed intermediate to zones B and C.

The individual zones A, B, and C are preferably formed separately and thereafter cemented together to form the entire reactor 2. Each section could most readily be fabricated by first forming a single continuous polystyrene structure representing the voids, that is, the polystyrene structure would conform in shape to the inlet ducts 4, outlet ducts 5, and channel 6. Around this structure, the particular moderator constituent of the section being fabricated, in granular or powdered form, would be cemented, utilizing a carbonaceous organic material as the binder. The structure would then be heated to a temperature sufficient to remove the polystyrene and the binder and to sinter the granular moderator. Each section having been formed as desribed above, the individual sections would be cut to conform to the desired mating shapes, and would thereafter be cemented together to form the porous structure illustrated in the drawings. A heated inert gas might then be forced through this porous structure to remove any remaining binder and to avoid tight places in the pores. Thereafter, the entire structure would be impregnated with the fissionable constituent, thereby forming the desired porous reactor.

The power level of the reactor can, of course, be controlled by any of the various known techniques of reactor control, such as the insertion of a variable length of a boron or cadmium control rod. Since such methods of reactor control are well understood by those skilled in the art, and since they form no part of the present invention, no particular type of control mechanism is illustrated in the drawings.

It will be seen that, in accordance with the principles of the present invention, applicant has realized an advantage from the positive temperature gradient which exists between the coolant inlet end and the coolant outlet end of an operating nuclear reactor. He has accomplished this by, in effect, dividing the entire reactor into successive sections along the direction of the temperature gradient, and in each section utilizing materials of construction which are most advantageous from a nuclear standpoint and which at the same time can withstand the expected operating temperature of that particular zone. The application of these principles by applicant results in a nuclear reactor which, proceeding from the coolant inlet to the coolant outlet end thereof, has successively better refractory properties and successively poorer nuclear properties. In this way, applicant has produced a nuclear reactor characterized simultaneously by a minimum critical size and mass and by the ability to heat a working fluid to an extremely high temperature.

It is to be understood that all matter contained in the above description and examples are illustrative only and do not limit the scope of this invention as it is intended to claim the invention as broadly as posible in view of the prior art. In particular, it should be understood that the principles of the present invention, as summarized in the preceding paragraph, are in no way limited to use in connection with rockets, but rather may be employed to advantage in any application calling for a nuclear reactor of small critical size and mass and having a high temperature rise from coolant inlet to coolant outlet end thereof.

What is claimed is:

1. In a neutronic reactor, an active portion containing fissionable nuclei and having a plurality of coolant channels extending therethrough, said active portion comprising a plurality of adjacent zones arranged generally along the temperature gradient established in said active portion during operation, each of said zones being characterized by a particular active material of construction individual to that zone, the respective active materials for the respective zones having successively better moderating properties in the direction of negative temperature gradient.

2. In a neutronic reactor, an active portion containing fissionable nuclei and having a plurality of coolant channels extending therethrough, said active portion comprising a plurality of adjacent zones arranged generally along the temperature gradient established in said active portion during operation, each of said zones being characterized by a particular active material of construction individual to that zone, the respective active materials for the respective zones having successively better refractory properties in the direction of positive temperature gradient and successively better moderating properties in the direction of negative temperature gradient.

3. In a neutronic reactor, an active portion containing fissionable material and moderator material and having a plurality of channels extending therethrough for the passage of a coolant fluid, said active portion comprising a plurality of adjacent zones arranged consecutively in the direction of coolant flow, each of said zones being characterized by a particular moderator material individual to that zone, the respective moderating materials for the respective zones having successively higher values of neutron slowing down power in the direction opposite to that of coolant flow.

4. In a neutronic reactor, an active portion containing fissionable material and moderator material and having a plurality of channels extending therethrough for the passage of a coolant fluid, said active portion comprising a plurality of adjacent zones arranged consecutively in the direction of coolant flow, each of said zones being characterized by a particular moderator material individual to that zone, the respective moderating materials for the respective zones having successively better heat resistant characteristics and successively lower values of neutron slowing down power in the direction of coolant flow.

5. In a neutronic reactor, an active portion containing fissionable material and moderator material and having a plurality of channels extending therethrough for the passage of a coolant fluid, said active portion comprising a plurality of adjacent zones arranged consecutively in the direction of coolant flow, each of said zones being characterized by a particular moderator material individual to that zone, the respective moderating materials for the respective zones having successively better heat resistant characteristics and successively lower values of neutron slowing down power in the direction of coolant flow, at least one of said zones comprising an hydrogenous material as moderator, and at least another of said zones comprising a carbonaceous material as moderator, said carbonaceous material containing zone being arranged after said hydrogenous material containing zone in the direction of coolant flow.

References Cited in the file of this patent

FOREIGN PATENTS

| | | |
|---|---|---|
| 114,150 | Australia | May 2, 1940 |
| 233,011 | Switzerland | Oct. 2, 1944 |

OTHER REFERENCES

Smyth: "Atomic Energy for Military Purposes," particularly pp. 22, 177, August 1945. Copy may be purchased from Supt. of Doc., Washington 25, D.C.

Goodman: "The Science and Engineering of Nuclear Power," vol. 1, p. 274, Addison-Wesley, Cambridge, Mass. (1947).

Goodman: "The Science and Engineering of Nuclear Power," vol. 1, pp. 275, 277, 279, Addison-Wesley (1947); vol. 2, pp. 177–195 and 277–281, Addison-Wesley (1949).

Wigner: "Atomic Energy," Science, pp. 517–521, November 12, 1948.

Kelly et al.: "Phys. Rev.," 73, 1135–9 (1948).

Atomics, vol. 6, No. 6, pp. 4–22, November-December 1950, publ. by Technical Publ. Co., Chicago, Ill.